US012597865B2

(12) United States Patent
Kuwahara et al.

(10) Patent No.: US 12,597,865 B2
(45) Date of Patent: Apr. 7, 2026

(54) INVERTER

(71) Applicant: NISSAN MOTOR CO., LTD.,
Yokohama (JP)

(72) Inventors: Takashi Kuwahara, Kanagawa (JP);
Toshihiro Yamashita, Kanagawa (JP);
Daisuke Asakura, Kanagawa (JP); **Seiji
Hoshika,** Kanagawa (JP)

(73) Assignee: NISSAN MOTOR CO., LTD.,
Yokohama (JP)

( * ) Notice: Subject to any disclaimer, the term of this
patent is extended or adjusted under 35
U.S.C. 154(b) by 289 days.

(21) Appl. No.: 17/908,366

(22) PCT Filed: Mar. 4, 2020

(86) PCT No.: PCT/JP2020/009180
§ 371 (c)(1),
(2) Date: Aug. 31, 2022

(87) PCT Pub. No.: WO2021/176601
PCT Pub. Date: Sep. 10, 2021

(65) Prior Publication Data
US 2023/0095375 A1 Mar. 30, 2023

(51) Int. Cl.
H02M 7/00 (2006.01)
H01R 13/518 (2006.01)

(52) U.S. Cl.
CPC .......... H02M 7/003 (2013.01); H01R 13/518
(2013.01); H01R 2201/26 (2013.01)

(58) Field of Classification Search
CPC ........ B60R 16/0239; B60L 3/003; B60L 3/00;
H02M 7/003; H01R 13/518;
(Continued)

(56) References Cited

U.S. PATENT DOCUMENTS 7,392,782 B2 *   7/2008   Fujii ................... F02M 69/465
                                                           123/195 C
11,541,943 B2 *   1/2023   Okamura ............... B60L 15/20
(Continued)

FOREIGN PATENT DOCUMENTS

CN          105196473   A     12/2015
DE    10 2010 014 503  A1    10/2011
(Continued)

OTHER PUBLICATIONS

"Locator to Position and Retain Part in Injection Molding Tool",
Research Disclosure, Kenneth Mason Publication, Hampshire, UK,
GB, No. 356, Dec. 1, 1993, p. 781.

*Primary Examiner* — Mohamed Abdo Algehaim
(74) *Attorney, Agent, or Firm* — Foley & Lardner LLP

(57) ABSTRACT
An inverter includes a case, and the case includes an upper
case and a lower case attached to a bottom surface side of the
upper case. The upper case includes a flange portion con-
stituting an attachment portion of the lower case, and a
connector connecting portion to which a connector is con-
nected. The connector connecting portion includes an outer
wall portion that forms an outer wall of the connector
connecting portion. At least a part of the flange portion and
at least a part of the outer wall portion are disposed so as to
overlap each other in a direction in which the connector
connecting portion and the structure face each other.

11 Claims, 7 Drawing Sheets

(58) Field of Classification Search
  CPC ............. H01R 2201/26; H05K 5/0247; H05K
              7/14322; Y02T 10/72
  USPC ......................................................... 701/301
  See application file for complete search history.

(56)                References Cited

U.S. PATENT DOCUMENTS

| 2013/0241282 | A1* | 9/2013 | Ikeno | B60R 16/03 |
| | | | | 307/9.1 |
| 2013/0270028 | A1* | 10/2013 | Young | B62D 21/152 |
| | | | | 180/274 |
| 2014/0097641 | A1* | 4/2014 | Hayano | B60L 3/0007 |
| | | | | 296/187.09 |
| 2014/0345960 | A1* | 11/2014 | Yamanaka | H05K 5/03 |
| | | | | 180/68.5 |
| 2015/0107920 | A1* | 4/2015 | Sakamoto | B60L 3/003 |
| | | | | 903/951 |
| 2015/0121767 | A1* | 5/2015 | Nagamori | H05K 5/03 |
| | | | | 49/463 |
| 2015/0246621 | A1* | 9/2015 | Katano | B60L 3/0007 |
| | | | | 180/65.31 |
| 2015/0258913 | A1* | 9/2015 | Kobayashi | B60L 58/20 |
| | | | | 180/65.21 |
| 2015/0305177 | A1* | 10/2015 | Nakashima | B60L 15/007 |
| | | | | 310/68 D |
| 2016/0072361 | A1* | 3/2016 | Kuramochi | B60L 50/16 |
| | | | | 180/65.21 |
| 2017/0155336 | A1* | 6/2017 | Yamazawa | H05K 7/14322 |
| 2019/0152331 | A1* | 5/2019 | Sawazaki | B60K 6/40 |
| 2019/0245415 | A1* | 8/2019 | Tokito | H02K 11/33 |
| 2020/0070756 | A1* | 3/2020 | Yuki | B60R 16/0239 |
| 2021/0331571 | A1* | 10/2021 | Itoh | B60K 1/04 |
| 2022/0324315 | A1* | 10/2022 | Tanizawa | B60L 3/003 |
| 2023/0163654 | A1* | 5/2023 | Asakura | B62D 21/152 |
| | | | | 310/71 |
| 2023/0166666 | A1* | 6/2023 | Hoshika | B60K 1/00 |
| | | | | 180/271 |

FOREIGN PATENT DOCUMENTS

| DE | 10 2015 209 519 A1 | 10/2011 |
| EP | 1 940 653 | 7/2008 |
| JP | 2013-126839 A | 1/2015 |
| JP | 2018-024382 A | 2/2018 |
| JP | 2019-051804 A | 4/2019 |
| WO | WO-2007/050536 A1 | 5/2007 |
| WO | WO-2011/124302 A1 | 10/2011 |

* cited by examiner

FRONT DIRECTION

COLLISION DIRECTION

INVERTER

TECHNICAL FIELD

The present invention relates to an inverter.

BACKGROUND ART

A power unit or the like that controls an operation of a motor generator is mounted on a vehicle such as an electric vehicle or a hybrid vehicle. Such a power unit is required to have a safety structure in which electric wiring is not exposed even at the time of a collision of the vehicle.

JP2013-126839A discloses, as a safety structure at the time of a vehicle collision, an in-vehicle device mounting structure in which a mounting bracket attached to an inverter is attached to an upper side of an inverter tray, and when a collision load is applied to a front portion of a vehicle, a rear end portion of the inverter tray abuts on a power unit mount.

SUMMARY OF INVENTION

In a configuration in which another structure is further attached to the inverter to buffer a collision as in the related art, there is a problem that not only the structure is complicated, but also the number of components is increased and the weight is also increased.

The present invention has been made in view of such a problem, and an object of the present invention is to provide an inverter that can ensure safety at the time of a collision.

According to an aspect of the present invention, an inverter disposed so as to face a structure mounted on a vehicle is provided. The inverter includes a case. The case includes an upper case and a lower case attached to a bottom surface side of the upper case. The upper case includes a flange portion constituting an attachment portion of the lower case, and a connector connecting portion to which a connector is connected. The connector connecting portion includes an outer wall portion that forms an outer wall of the connector connecting portion. At least a part of the flange portion and at least a part of the outer wall portion are disposed so as to overlap each other in a direction in which the connector connecting portion and the structure face each other.

According to the present invention, since an outer wall portion of a connector connecting portion and a flange portion having a structurally high strength are disposed so as to overlap each other in a direction facing a structure, a strength of the connector connecting portion can be secured. Accordingly, damage to a case can be prevented even at the time of a collision, and safety at the time of a collision can be improved.

DESCRIPTION OF EMBODIMENTS

Hereinafter, embodiments of the present invention will be described with reference to the drawings and the like.

Figure 1:
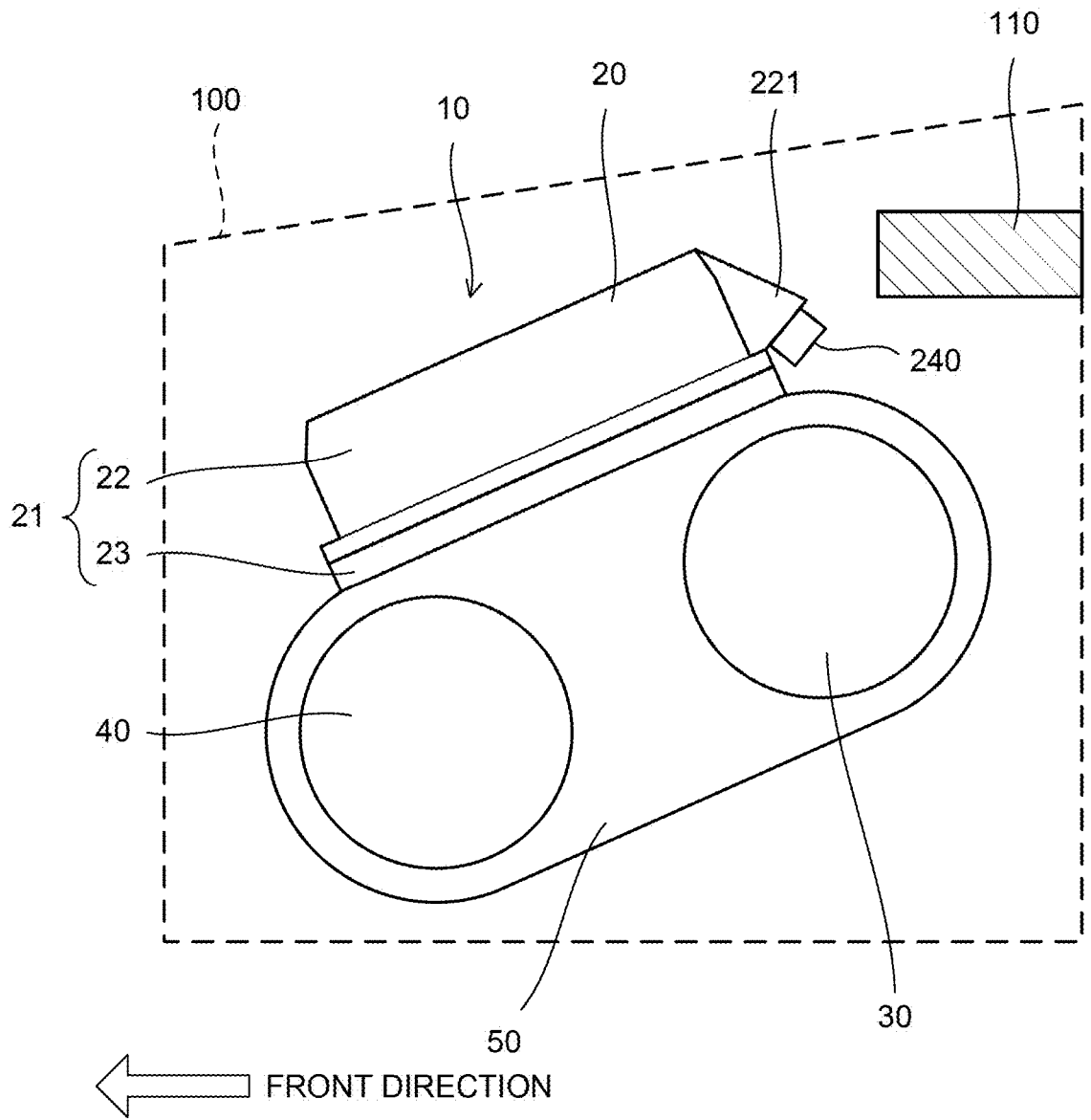
FIG. 1 is a side view of a drive system including an inverter according to an embodiment of the present invention.
Figure 2:
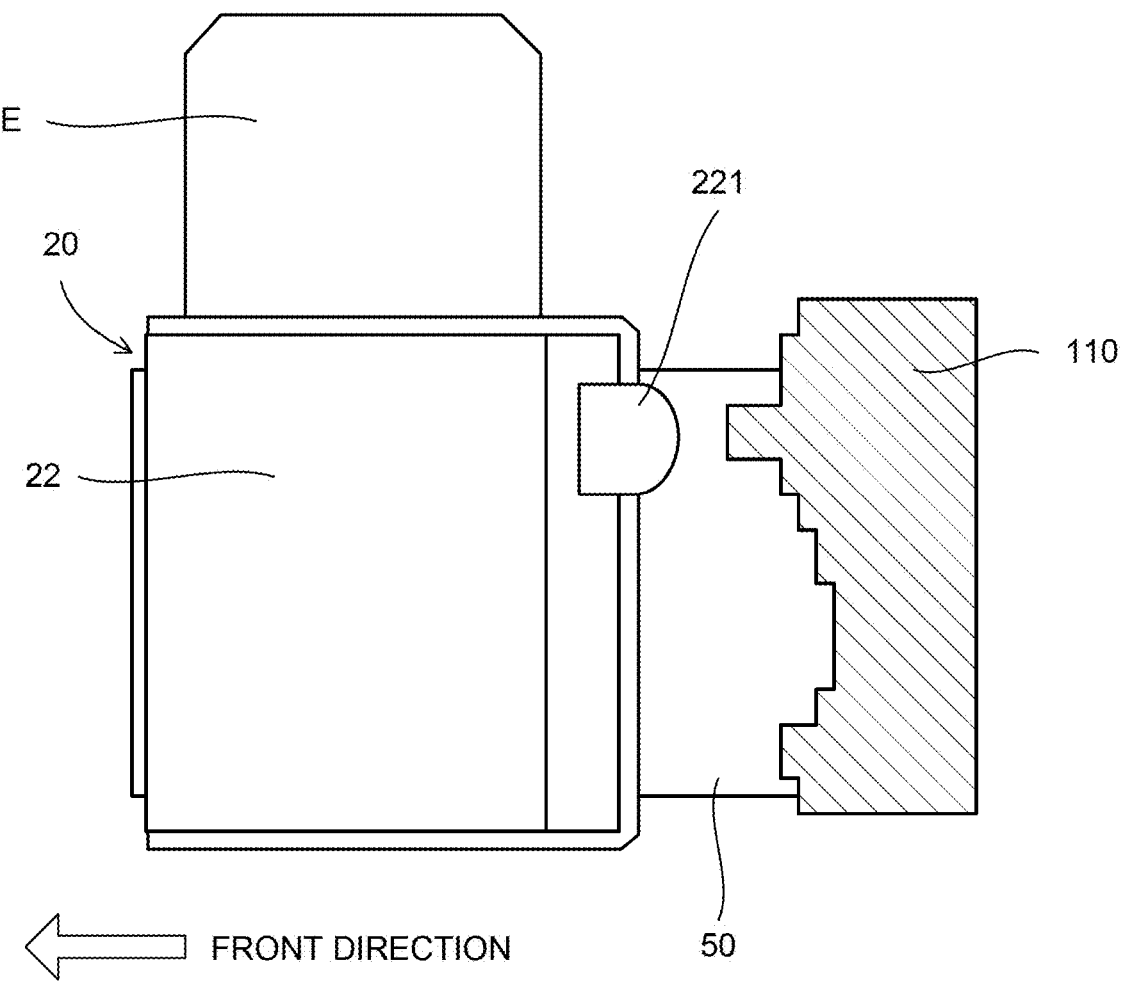
FIG. 2 is a top view of the drive system.

FIGS. 1 and 2 are explanatory diagrams of a drive system 10 including an inverter 20 according to an embodiment of the present invention. FIG. 1 is a side view of the drive system 10, and FIG. 2 is a top view of the drive system 10.

In FIGS. 1 and 2, a left side of the figures indicates a front side of a vehicle, and a right side of the figures indicates a rear side of the vehicle.

As shown in FIGS. 1 and 2, the drive system 10 is mounted in a motor room 100 partitioned on the front side of the vehicle, and drives drive wheels (not shown) to cause the vehicle to travel. The motor room 100 may be located not on the front side of the vehicle but on the rear side of the vehicle, or may be near a center of the vehicle. The drive wheels may be front wheels or rear wheels.

The drive system 10 includes an inverter 20, a drive motor 30, a generator 40, and an engine E (see FIG. 2).

The drive motor 30 and the generator 40 are housed in a housing 50. The inverter 20 is fixed to an upper portion of the housing 50. The inverter 20 is fixed so as to be inclined obliquely downward toward the front side of the vehicle.

The inverter 20 supplies electric power from a battery (not shown) to the drive motor 30 to drive the drive motor 30. The inverter 20 supplies electric power generated by the generator 40 to the drive motor 30 to drive the drive motor 30, and charges the battery.

The drive motor 30 is driven by electric power supplied from the inverter 20. At the time of deceleration of the vehicle, the drive motor 30 receives a driving force from the drive wheels to generate electric power (regenerate electric power). The generated electric power is charged to the battery via the inverter 20.

The generator 40 generates electric power by receiving a driving force of an engine E as a driving force source. The engine E is, for example, a gasoline engine.

The inverter 20 is configured such that functional components (a power module, a capacitor, and the like) are housed in a case 21.

The case 21 includes an upper case 22 and a lower case 23. The upper case 22 is formed in a box shape whose bottom surface side is open. The lower case 23 forms a bottom surface of the upper case 22. The lower case 23 is fixed to the housing 50, and the upper case 22 and the lower case 23 are fixed to each other by fastening with bolts or the like.

The upper case 22 and the lower case 23 are formed by casting using an alloy such as aluminum as a material, for example.

A plurality of openings through which signal lines and power lines are pulled are formed in the case 21. The upper case 22 includes a low-voltage connector connecting portion 221 for fixing a low-voltage connector 240 through which a low-voltage wiring is pulled. The upper case 22 is also formed with high-voltage connector connecting portions 222a and 222b and the like for fixing high-voltage connectors (not shown) through which high-voltage wiring is pulled (see FIG. 3).

The low-voltage connector connecting portion 221 is provided on a side surface of the upper case 22, and is formed so as to be inclined obliquely downward toward the rear side of the vehicle. The low-voltage connector connecting portion 221 is formed with a passage-shaped opening 214 through which the inside and outside of the case 21 communicate with each other, and the low-voltage connector 240 is attached to the opening 214.

Figure 3:
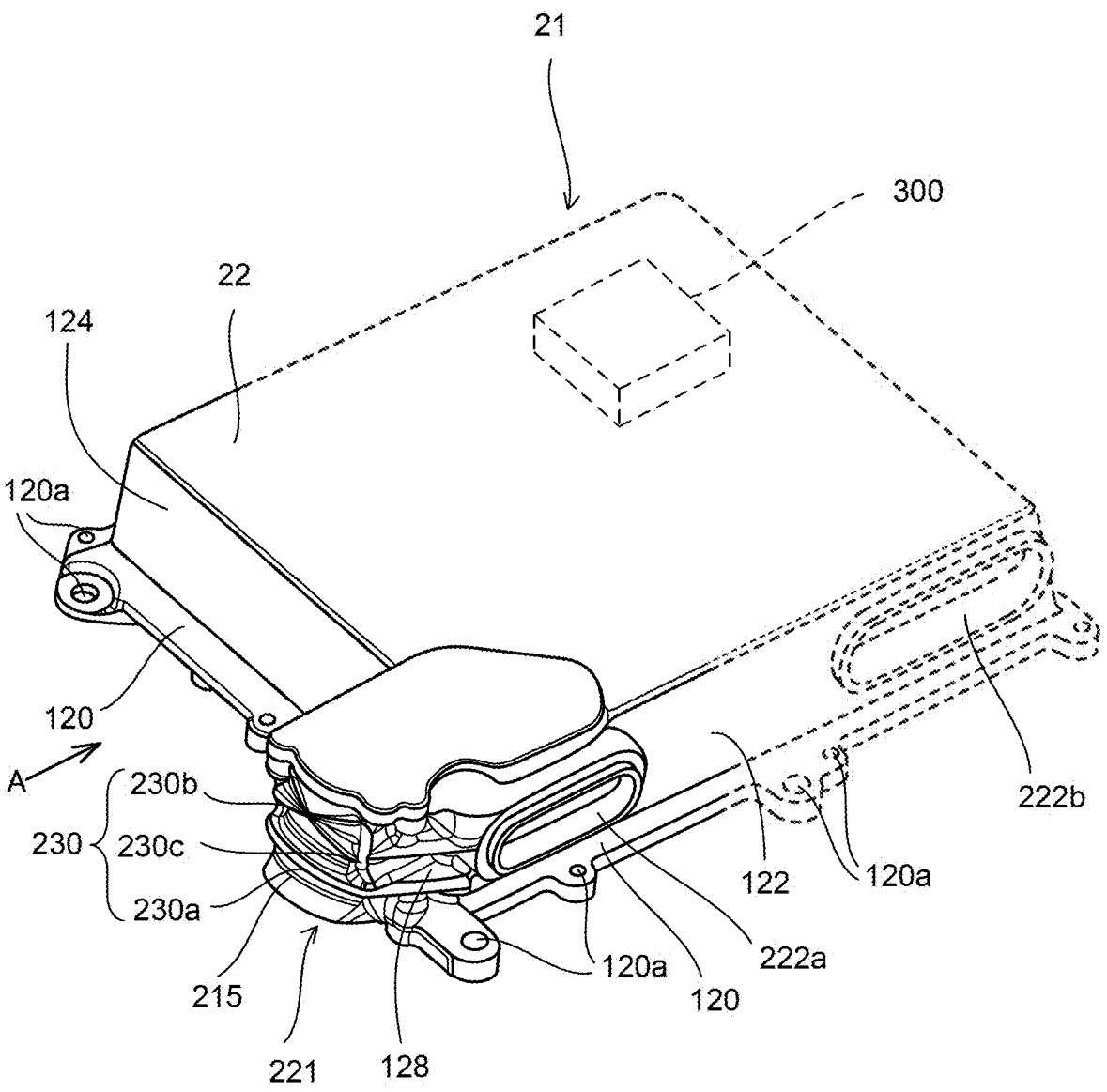
FIG. 3 is a perspective view of an upper case.
Figure 4:
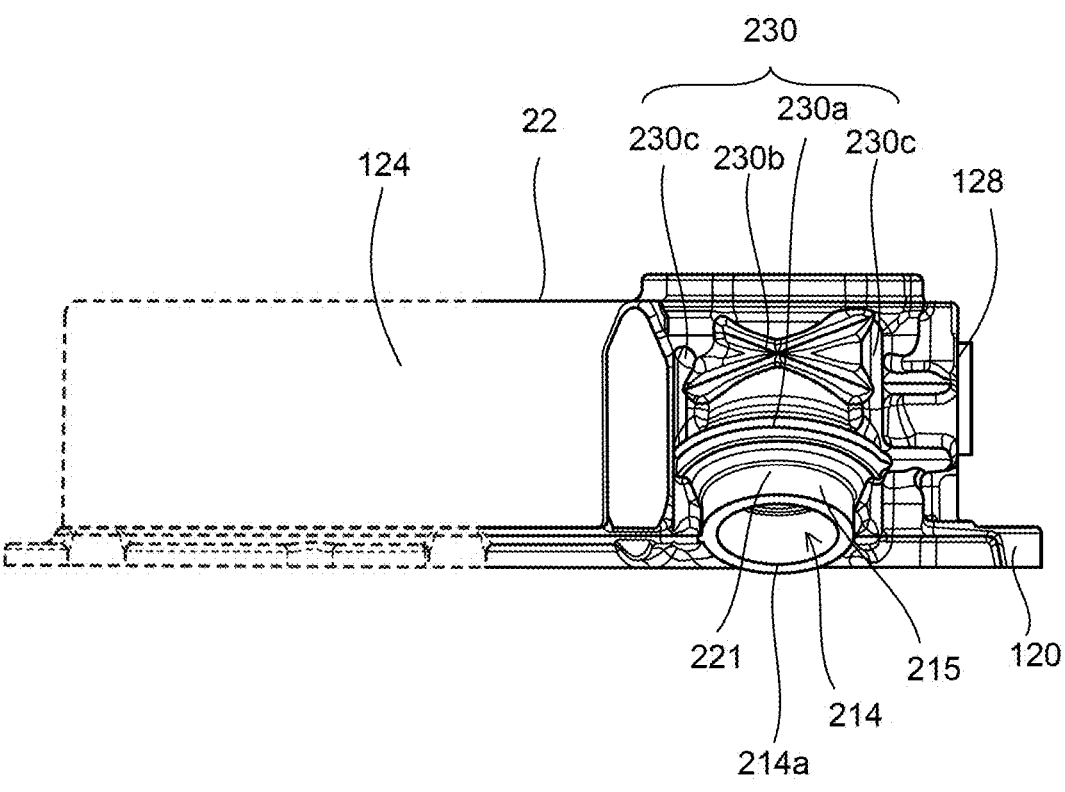
FIG. 4 is a front view of the upper case.

Next, a structure of the case 21 of the inverter 20 according to the present embodiment will be described. FIG. 3 is a perspective view of the upper case 22, and FIG. 4 is a front view (arrow A in FIG. 3) of the upper case 22.

The upper case 22 has a box shape whose bottom surface side is open. A flange portion 120 is formed around a lower end side (lower case 23 side) of the upper case 22. The flange portion 120 protrudes to the outside of four sides of the case 21 on a bottom surface side of the upper case 22. The flange portion 120 has a plurality of fixing holes 120*a* penetrating in a vertical direction. The fixing holes 120*a* are formed at a position communicating with fixing holes similarly formed in the lower case 23. When the upper case 22 is attached to the lower case 23, the upper case 22 and the lower case 23 are fixed by screwing bolts or the like into these fixing holes. In this way, by screwing the bolts into the fixing holes 120*a*, an attachment portion is formed in which the upper case 22 is attached to the lower case 23.

In the low-voltage connector connecting portion 221, an outer wall portion 215 is formed so as to bulge in an arch shape from a side surface 124 on the rear side of the upper case 22 in a vehicle traveling direction toward the rear side. The low-voltage connector 240 (see FIG. 1) through which a signal having a relatively low voltage flows in the inverter 20 is connected to the opening 214 of the low-voltage connector connecting portion 221.

On a side surface 122 on the side (left side when facing the traveling direction) of the upper case 22 in the vehicle traveling direction, high-voltage connector connecting portions 222*a* and 222*b* to which high-voltage connectors through which electric power having a relatively high voltage flows in the inverter 20 are connected are formed.

A high-voltage component 300 including a power module, a capacitor, and the like to which a relatively high voltage is applied in the inverter 20 is provided inside the case 21. The high-voltage component 300 is provided inside the inverter 20 at a position separated from the low-voltage connector connecting portion 221 (adjacent to a side surface located on a vehicle front side opposite to the side surface 124). The high-voltage component 300 is connected to the high-voltage connector inside the inverter 20.

As shown in FIGS. 1 and 2, since the low-voltage connector connecting portion 221 bulges from the side surface 124 of the upper case 22, in the motor room 100, a structure 110 existing in the vicinity of the inverter 20 may collide with the inverter 20 at the time of a collision of the vehicle. In this case, there is a possibility that the low-voltage connector connecting portion 221 is damaged, and the safety of the inverter 20 is reduced. In order to improve safety, it is desirable to increase the strength of the low-voltage connector connecting portion 221.

In order to increase the strength of the low-voltage connector connecting portion 221, it is conceivable to increase the thickness of the outer wall portion 215 of the low-voltage connector connecting portion 221. However, it is generally known that when the thickness of a cast component is increased, the number of blow holes is increased. There is a possibility that the waterproof property of the case 21 is deteriorated due to formation of the blow holes.

Meanwhile, since the low-voltage connector connecting portion 221 of the present embodiment has a cylindrical opening 214 on an inner side thereof, it is difficult to visually check a blow hole as compared with a flat plate-shaped portion (for example, the flange portion 120, the side surface 124, or the like), and it is also difficult to perform post-processing such as polishing, cutting, or the like, and thus it is difficult to perform management for preventing an influence of the blow hole. In order to suppress the formation of the blow hole, it is required to make the thickness of the low-voltage connector connecting portion 221 thin. However, if the thickness is thin, the strength of the low-voltage connector connecting portion 221 is reduced, and thus the safety at the time of a collision is reduced.

Therefore, in the present embodiment, the strength of the low-voltage connector connecting portion 221 is increased to ensure safety, and the configuration is as follows.

Figure 5:
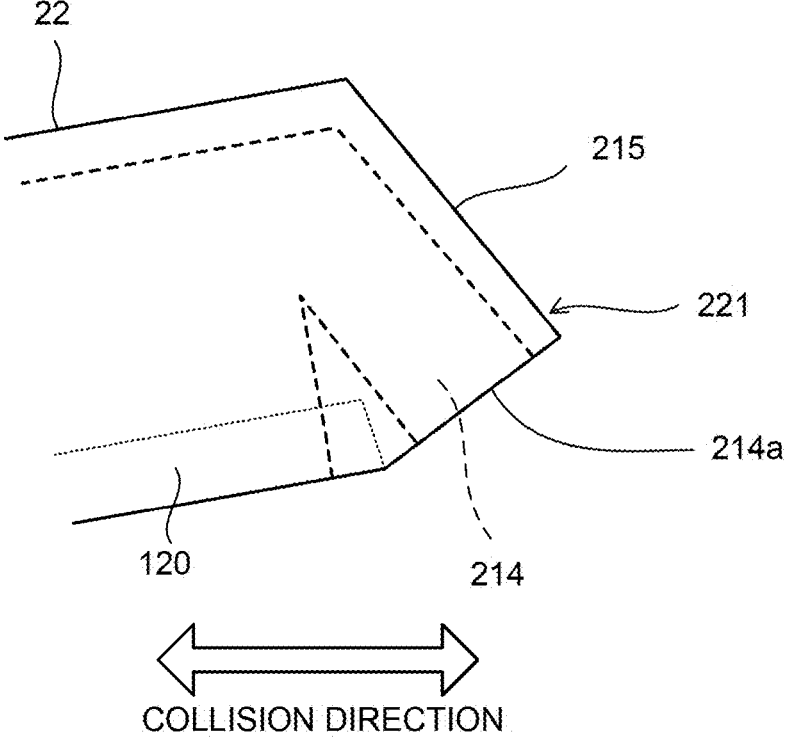
FIG. 5 is an explanatory view showing a relation between a low-voltage connector connecting portion and a flange portion.

As shown in FIGS. 3 and 4, the low-voltage connector connecting portion 221 is disposed adjacent to the flange portion 120. That is, at least a part (opening end 214*a*) of the low-voltage connector connecting portion 221 and the flange portion 120 are disposed so as to overlap each other in a front-rear direction of the vehicle, that is, a direction in which the low-voltage connector connecting portion 221 and the structure 110 face each other (the front-rear direction or horizontal direction of the vehicle). More specifically, as shown in FIG. 5, the opening end 214*a* of the low-voltage connector connecting portion 221 and the flange portion 120 are integrally formed in a direction of an arrow in the figure.

Thus, in the upper case 22, the flange portion 120 having a high structural strength is integrally formed with the low-voltage connector connecting portion 221, so that the strength of the low-voltage connector connecting portion 221 can be increased without adding a new component to the case 21. Further, since the opening 214 of the low-voltage connector connecting portion 221 has a cylindrical shape, the opening 214 is structurally strong against a force applied in a radial direction.

The front-rear direction of the vehicle is also a direction in which the inverter 20 and the structure 110 disposed to face each other collide with each other at the time of a collision of the vehicle (hereinafter, the front-rear direction is also referred to as a "collision direction"). In contrast, since the low-voltage connector connecting portion 221 and the structure 110 are disposed so as to overlap each other in a collision direction, even when the low-voltage connector connecting portion 221 collides with the structure 110, it is possible to prevent the low-voltage connector connecting portion 221 from being damaged.

The outer wall portion 215 serving as the outer wall of the low-voltage connector connecting portion 221 has an arch shape bulging outward, and a rib 230 for reinforcing the outer wall portion 215 is formed on an outer peripheral surface of the outer wall portion 215.

In the present embodiment, as shown in FIGS. 3 and 4, ribs 230 (first rib 230*a*, second rib 230*b*, and third rib 230*c*) are formed on the outer wall portion 215 of the low-voltage connector connecting portion 221.

The first rib 230*a* is formed to bulge along the outer peripheral surface of the outer wall portion 215 substantially parallel to the opening end 214*a* of the opening 214 of the low-voltage connector connecting portion 221. The second rib 230*b* is formed by two ribs that are inclined with respect to the opening end 214*a* of the low-voltage connector connecting portion 221 and that bulge along the outer peripheral surface of the outer wall portion 215 and intersect each other near a center of the outer wall portion 215. The third rib 230*c* is composed of two ribs formed vertically in the same direction as a passage direction of the opening 214 on both sides of the outer wall portion 215 of the low-voltage connector connecting portion 221.

In this way, by providing the rib 230 on the outer wall portion 215 of the low-voltage connector connecting portion 221, it is possible to increase the strength of the outer wall portion 215. The rib 230 may have various shapes as long as the rib 230 has a structure for reinforcing the outer wall portion 215. The outer wall portion 215 may be provided with a ridge formed substantially parallel to the opening end 214*a*, at least as in the first rib 230*a*.

The low-voltage connector connecting portion 221 is formed at a position adjacent to a corner portion 128 (a portion which is a corner of the upper case 22 having a rectangular shape in a plan view) at which the side surface 122 and the side surface 124 of the upper case 22 intersect with each other. In this way, the low-voltage connector connecting portion 221 is disposed adjacent to the corner portion 128 having a high structural strength in the upper case 22, so that the strength of the low-voltage connector connecting portion 221 can be further increased.

Figure 6:
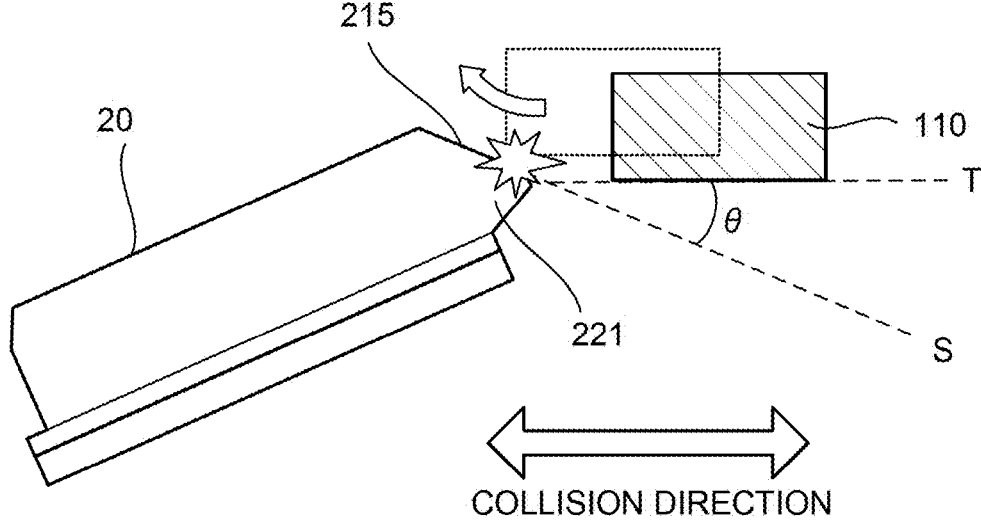
FIG. 6 is an explanatory view showing a relation between the low-voltage connector connecting portion and a structure.

As shown in FIG. 1, the inverter 20 of the present embodiment is fixed so as to be inclined obliquely downward toward the front side of the vehicle. More specifically, the outer wall portion 215 of the low-voltage connector connecting portion 221 is formed to be inclined obliquely downward. With such a configuration, as shown in FIG. 6, a contact angle between an extension line S extending from the outer wall portion 215 of the low-voltage connector connecting portion 221 in a tangential direction and an extension line T extending from the structure 110 to the low-voltage connector connecting portion 221 in a facing direction (collision direction) is θ. The contact angle θ is preferably an acute angle. In this way, the extension line of the outer wall portion 215 and the extension line of the side surface of the structure 110 are arranged at the contact angle θ, so that the structure 110 moves along an inclination of an outer surface of the outer wall portion 215 even when the structure 110 and the case 21 come into contact with each other at the time of a collision. Accordingly, the impact acting on the low-voltage connector connecting portion 221 can be dispersed, and the low-voltage connector connecting portion 221 and the case 21 can be prevented from being damaged.

Depending on the impact at the time of a collision or the shape of the structure 110, the structure 110 may abut on an end portion of the low-voltage connector connecting portion 221 on an opening side. Even in such a case, since the strength of the low-voltage connector connecting portion 221 is high as described above, the structure 110 prevents the case 21 from being damaged.

As described above, the inverter 20 of the embodiment of the present invention includes the case 21, and the structure 110 is disposed adjacent to the inverter 20. The case 21 includes the upper case 22 and the lower case 23 attached to the bottom surface side of the upper case 22. The upper case 22 includes the flange portion 120 constituting the attachment portion of the lower case 23, and the low-voltage connector connecting portion 221 to which the low-voltage connector 240 is connected. The low-voltage connector connecting portion 221 includes the outer wall portion 215 forming the outer wall of the low-voltage connector connecting portion 221, and at least a part of the flange portion 120 and at least a part of the outer wall portion 215 are disposed so as to overlap each other in a direction in which the low-voltage connector connecting portion 221 and the structure 110 face each other.

With this configuration, the low-voltage connector connecting portion 221 and the flange portion 120 having a high structural strength are disposed to overlap with each other, so that the strength of the low-voltage connector connecting portion 221 can be secured, and the case 21 can be prevented from being damaged at the time of a collision, and thus safety can be improved.

Figure 7:
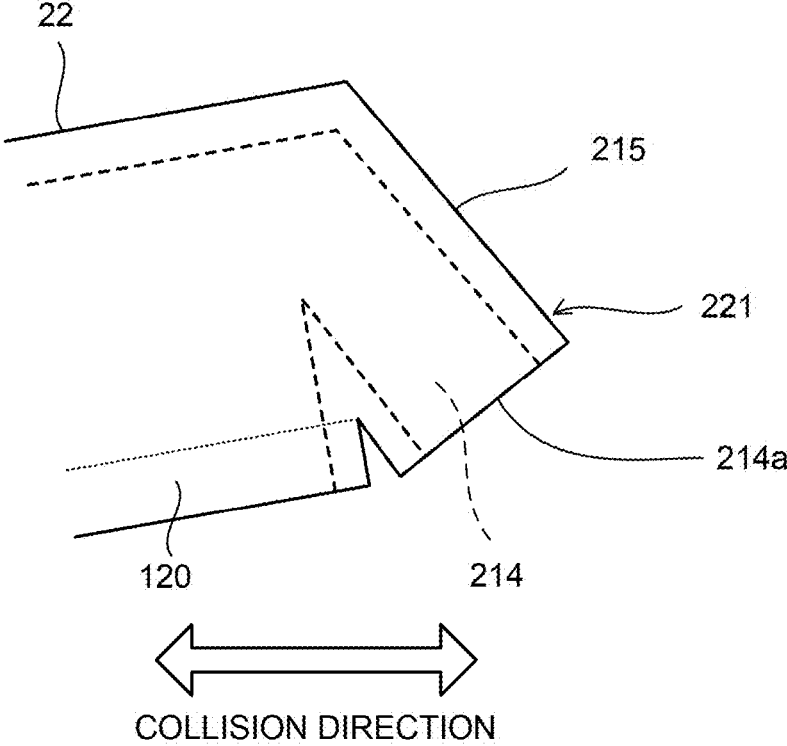
FIG. 7 is an explanatory view showing another example of the relationship between the low-voltage connector connecting portion and the flange portion.

As in another example shown in FIG. 7, the opening end 214*a* of the low-voltage connector connecting portion 221 and the flange portion 120 may be disposed so as to overlap each other in a state of being separated from each other in the collision direction. The strength of the low-voltage connector connecting portion 221 can be increased even when the flange portion 120 having a high structural strength and the low-voltage connector connecting portion 221 are disposed so as to overlap each other in the collision direction.

In the inverter 20 of the embodiment of the present invention, the outer wall portion 215 has an arch shape, and the low-voltage connector connecting portion 221 is formed with the rib 230 in a direction along an outer peripheral shape of the outer wall portion 215. Accordingly, the strength of the outer wall portion 215 is further increased.

In the inverter 20 of the embodiment of the present invention, the low-voltage connector connecting portion 221 is formed adjacent to the corner portion 128 of the upper case 22 in a plan view. Accordingly, the strength of the low-voltage connector connecting portion 221 can be secured by being adjacent to the corner portion 128 having a high structural strength.

In the inverter 20 of the present embodiment, the flange portion 120 has the fixing hole 120*a* which is a through hole through which the bolt constituting the attachment portion of the lower case 23 penetrates at a position adjacent to the corner portion 128. Accordingly, the strength of the low-voltage connector connecting portion 221 can be secured by being adjacent to the attachment portion having a high structural strength.

The inverter 20 of the present embodiment includes the high-voltage component 300 (power module, capacitor, and the like), and the high-voltage component 300 is disposed at a position separated from the low-voltage connector connecting portion 221 in the case 21. Accordingly, at the time of a collision, the structure 110 first abuts on the outer wall portion 215 of the low-voltage connector connecting portion 221, and does not come into direct contact with these high-voltage components, so that the safety at the time of a collision can be improved.

In the inverter 20 of the present embodiment, the extension line of the outer peripheral surface of the outer wall portion 215 and the extension line of the side surface of the structure 110 are disposed at a predetermined contact angle θ with each other. Accordingly, even when the structure 110 collides with the case 21 at the time of a collision, the structure 110 moves along the inclination of the outer surface of the outer wall portion 215 of the low-voltage connector connecting portion 221, so that the impact can be dispersed.

Although the embodiment and the modification of the present invention have been described above, the above embodiment and modification are merely a part of application examples of the present invention, and do not mean that the technical scope of the present invention is limited to the specific configurations of the above embodiment.

In the present embodiment described above, the case 21 of the inverter 20 has been described as an example, but the present invention is not limited thereto. The present invention may be applied to a case of another functional component disposed in the motor room 100.

In the present embodiment, a hybrid electric vehicle that travels by driving the drive motor 30 has been described as an example, but the present invention is not limited thereto. The vehicle may be a parallel hybrid vehicle that travels by the driving motor 30 and the driving force of the engine E.

The invention claimed is:

1. An inverter disposed so as to face a structure mounted on a vehicle, the inverter comprising:
   a case, wherein:
   the case includes an upper case and a lower case attached to a bottom surface side of the upper case,
   the upper case includes a flange portion that extends peripherally around the upper case and constitutes an attachment portion that is attached to the lower case, and a connector connecting portion provided on a side of the upper case and configured to connect to a connector,
   the connector connecting portion includes an outer wall portion that protrudes from the side of the upper case and has a cylindrical shape,
   at least a part of the flange portion and at least a part of the outer wall portion are disposed so as to overlap each other in a direction in which the connector connecting portion and the structure face each other,
   an opening end of the connector connecting portion and the flange portion are integrally formed in the direction in which the connector connecting portion and the structure face each other, and
   the connector connecting portion includes a rib formed in a circumferential direction along and protruding from an outer peripheral surface of the outer wall portion.

2. The inverter according to claim 1, wherein:
   the connector connecting portion is formed adjacent to a corner portion of the upper case in a plan view.

3. The inverter according to claim 2, wherein:
   the flange portion has a through hole through which a bolt constituting the attachment portion of the lower case penetrates at a position adjacent to the corner portion.

4. The inverter according to claim 1 wherein:
   the inverter has a high-voltage component, and
   the high-voltage component is disposed at a position separated from the connector connecting portion in the case.

5. The inverter according to claim 1, wherein:
   an extension line of an outer peripheral surface of the outer wall portion and an extension line of a side surface of the structure are disposed at a predetermined contact angle θ with each other.

6. The inverter according to claim 1, wherein:
   the connector connecting portion and the structure face each other in a front-rear direction of the vehicle.

7. An inverter disposed so as to face a structure mounted on a vehicle, the inverter comprising:
   a case, wherein:
   the case includes an upper case and a lower case attached to a bottom surface side of the upper case,
   the upper case includes a flange portion that extends peripherally around the upper case and constitutes an attachment portion that is attached to the lower case, and a connector connecting portion provided on a side of the upper case and configured to connect to a connector,
   the connector connecting portion includes an outer wall portion that protrudes from the side of the upper case and has a cylindrical shape, wherein the outer wall portion and the structure facing each other in a front-rear direction of the vehicle, and the outer wall portion is inclined obliquely downward such that, in case of a collision of the vehicle, the structure comes into contact with the outer wall portion at an acute contact angle,
   an opening end of the connector connecting portion is integrally formed with the flange portion so as to overlap each other in the front-rear direction, and
   the connector connecting portion includes a rib formed in a circumferential direction along and protruding from an outer peripheral surface of the outer wall portion so as to bulge outward.

8. The inverter according to claim 7, wherein:
   the connector connecting portion is formed adjacent to a corner portion of the upper case in a plan view.

9. The inverter according to claim 8, wherein:
   the flange portion has a through hole through which a bolt constituting the attachment portion of the lower case penetrates at a position adjacent to the corner portion.

10. The inverter according to claim 7 wherein:
    the inverter has a high-voltage component, and
    the high-voltage component is disposed at a position separated from the connector connecting portion in the case.

11. The inverter according to claim 7, wherein:
    an extension line of an outer peripheral surface of the outer wall portion and an extension line of a side surface of the structure are disposed at a predetermined contact angle θ with each other.

* * * * *